(12) United States Patent
Deng et al.

(10) Patent No.: US 12,706,468 B2
(45) Date of Patent: Aug. 11, 2026

(54) BATTERY CONNECTION STATUS DETECTION CIRCUIT AND METHOD, BATTERY, DEVICE, AND SYSTEM

(71) Applicant: Huawei Digital Power Technologies Co., Ltd., Shenzhen (CN)

(72) Inventors: Shuhao Deng, Dongguan (CN); Denghai Pan, Shenzhen (CN); Hong Tuo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 773 days.

(21) Appl. No.: 18/180,649

(22) Filed: Mar. 8, 2023

(65) Prior Publication Data

US 2023/0223767 A1 Jul. 13, 2023

Related U.S. Application Data

(63) Continuation of application No. PCT/CN2020/113922, filed on Sep. 8, 2020.

(51) Int. Cl.

| | |
|---|---|
| ***H02J 7/00*** | (2026.01) |
| ***H01M 10/42*** | (2006.01) |
| ***H01M 10/48*** | (2006.01) |
| ***H02J 7/34*** | (2006.01) |
| ***H02J 7/50*** | (2026.01) |
| ***H02J 7/60*** | (2026.01) |
| ***H02J 7/80*** | (2026.01) |

(52) U.S. Cl.

CPC ........... *H02J 7/575* (2026.01); *H01M 10/425* (2013.01); *H01M 10/482* (2013.01); *H02J 7/345* (2013.01); *H02J 7/685* (2026.01); *H02J 7/80* (2026.01); *H01M 2010/4271* (2013.01); *H02J 7/60* (2026.01)

(58) Field of Classification Search

CPC ...... H02J 7/0024; H02J 7/0036; H02J 7/0047; H02J 7/345; H02J 7/0029; H02J 7/007184; H02J 7/0068; H01M 2010/4271; H01M 10/425; H01M 10/482

USPC .......................................................... 320/116

See application file for complete search history.

(56) References Cited

U.S. PATENT DOCUMENTS

| | | | | |
|---|---|---|---|---|
| 2013/0043841 | A1 | 2/2013 | Wei | |
| 2020/0381929 | A1 * | 12/2020 | Jin | H02J 7/00 |

FOREIGN PATENT DOCUMENTS

| | | | |
|---|---|---|---|
| CN | 103545882 | A | 1/2014 |
| CN | 102680909 | B | 2/2015 |
| CN | 105572593 | A | 5/2016 |
| CN | 105699904 | A | 6/2016 |

(Continued)

*Primary Examiner* — Zixuan Zhou

(57) ABSTRACT

The battery includes a cell pack. The detection circuit includes a first switch unit, a second switch unit, a discharge unit, a sampling unit, an energy storage unit, and a controller. A first terminal of the first switch unit is connected to a first terminal of the cell pack. A second terminal of the first switch unit is connected to a second terminal of the cell pack after being connected in series to the energy storage unit. The second switch unit is connected in parallel to the energy storage unit after being connected in series to the discharge unit. The discharge unit discharges the energy storage unit. The sampling unit is connected in parallel to the energy storage unit. The sampling unit sends an obtained sampling signal to the controller.

13 Claims, 8 Drawing Sheets

(56) References Cited

FOREIGN PATENT DOCUMENTS

| | | | |
|---|---|---|---|
| CN | 106407146 | A | 2/2017 |
| CN | 207339307 | U | 5/2018 |
| CN | 109490789 | A | 3/2019 |

* cited by examiner

BATTERY CONNECTION STATUS DETECTION CIRCUIT AND METHOD, BATTERY, DEVICE, AND SYSTEM

CROSS-REFERENCE TO RELATED APPLICATIONS

This application is a continuation of International Application No. PCT/CN2020/113922, filed on Sep. 8, 2020, the disclosure of which is hereby incorporated by reference in its entirety.

TECHNICAL FIELD

This application relates to the field of power electronics technologies, and in particular, to a battery connection status detection circuit and method, a battery, a device, and a system.

BACKGROUND

At present, as various power-consuming devices generate increasingly higher requirements on an energy storage system, a lithium battery is widely used because of its features, such as high energy density and a long battery cycle life.

A battery management system (BMS) of the lithium battery needs to accurately obtain connection status information of the lithium battery in time, so that when the lithium battery is in an islanding state, the lithium battery can be controlled to enter a standby state in time. The islanding state means that the battery has no communication with the outside currently, and the battery is not in a charging or discharging state. However, the lithium battery uses a same port for charging and discharging, and a voltage range of an external charging module overlaps a discharging voltage range of the lithium battery. Consequently, it is difficult to distinguish whether a voltage of the port is resulted from discharging of the lithium battery or is maintained by another external power supply. When the battery is in the islanding state but the external charging module is connected normally, or when the battery is connected but the external charging module encounters a power failure, it is difficult to determine whether the lithium battery is in the islanding state based on the voltage of the port.

SUMMARY

This application provides a battery connection status detection circuit and method, a battery, a device, and a system, so as to determine whether the battery is connected.

According to a first aspect, this application provides a battery connection status detection circuit. The detection circuit is disposed in a battery. The battery includes a cell pack. The detection circuit includes a first switch unit, a second switch unit, a discharge unit, a sampling unit, an energy storage unit, and a controller. A first terminal of the first switch unit is connected to a first terminal of the cell pack. A second terminal of the first switch unit is connected to a second terminal of the cell pack after being connected in series to the energy storage unit. The second switch unit is connected in parallel to the energy storage unit after being connected in series to the discharge unit. The discharge unit is configured to discharge the energy storage unit. The sampling unit is connected in parallel to the energy storage unit, and the sampling unit is configured to send a sampling signal to the controller. The controller is configured to control the first switch unit and the second switch unit, and determine, based on the obtained sampling signal, whether the battery is connected.

The controller can enable, by controlling working statuses of the first switch unit and the second switch unit, the discharge unit to discharge the energy storage unit. When the battery is in a connected state (connected to a system), the energy storage unit is connected to the discharge unit and an external power supply unit, and a voltage drops slowly. When the battery is in an islanding state (disconnected from a system), the energy storage unit is discharged by the discharge unit, and the voltage of the energy storage unit drops fast. Therefore, a voltage at both terminals of the energy storage unit changes at different speeds in different connection states. The sampling unit and the energy storage unit are connected in parallel, and a change of a voltage signal obtained by the sampling unit may represent a change of the voltage at both terminals of the energy storage unit. Therefore, the controller can determine a current connection status of the battery based on the sampling signal of the sampling unit. The detection circuit may be controlled by the controller to actively perform detection. The first switch unit and the second switch unit may be opened when detection is not needed. Therefore, no additional loss is caused.

With reference to the first aspect, in a first embodiment, the controller first controls both the first switch unit and the second switch unit to be closed, then controls the first switch unit to be opened for a preset time period, and determines, based on sampling signals obtained before and after the preset time period, whether the battery is connected. When the battery is in the connected state (connected to a system), the energy storage unit is connected to the discharge unit and an external power supply unit, and the voltage drops slowly. When the battery is in the islanding state, the energy storage unit is discharged by the discharge unit, and the voltage of the energy storage unit drops fast. Therefore, the voltage at both terminals of the energy storage unit changes at different speeds in different connection states. The preset time period may be adjusted based on an actual requirement, for example, may be set to a time length of a microsecond level, so as to implement fast battery connection status detection.

With reference to the first aspect, in a second embodiment, the sampling signal is a voltage at both terminals of the energy storage unit, and the controller is configured to determine, based on a difference of the voltages obtained before and after the preset time period, whether the battery is connected. When the voltage difference is greater than or equal to a preset voltage difference, it is determined that the battery is disconnected. When the voltage difference is greater than or equal to the preset voltage difference, it indicates that the energy storage unit is disconnected from an external power supply unit in this case, and discharge is performed only by using the discharge unit. Therefore, the voltage changes faster. With reference to the first aspect, in a third embodiment, the controller is configured to determine a detected value of an electrical parameter of the energy storage unit based on the sampling signals obtained before and after the preset time period, and compare the detected value with a preset electrical parameter value to determine whether the battery is connected.

When the battery is connected to the system normally, because another power supply unit is also connected in parallel to the system, the detected value of the electrical parameter that is obtained by the controller corresponds to a whole formed by both the energy storage unit and the another power supply unit. Alternatively, when the battery is disconnected from the system, the detected value of the electrical parameter corresponds to only the electrical parameter of the energy storage unit. Therefore, the controller may determine a connection status of the battery by using the detected value of the electrical parameter of the energy storage unit.

With reference to the first aspect, in a fourth embodiment, the energy storage unit includes an energy storage capacitor, and the electrical parameter is a capacitance. In addition, another power supply unit connected in the circuit also correspondingly includes a bus capacitor. When the battery is connected to the system normally, because another power supply unit is also connected in parallel to the system, a detected value of a capacitance that is obtained by the controller is an equivalent value of the capacitor of the energy storage unit and the bus capacitor of the power supply unit. Alternatively, when the battery is disconnected from the system, the detected value of the electrical parameter corresponds only to a capacitance of the energy storage unit. Therefore, the controller may determine a connection status of the battery by using the detected value of the capacitance.

With reference to the first aspect, in a fifth embodiment, the discharge unit includes a heating film circuit, and the heating film circuit is configured to heat the battery, so as to improve working performance of the battery in a low temperature environment. When the energy storage unit is discharged by using the heating film circuit, consumed electric energy may be converted into thermal energy instead of being entirely wasted, so as to improve the working performance of the battery.

With reference to the first aspect, in a sixth embodiment, the discharge unit includes a resistor. The resistor may be a single resistor, or may be a resistor network formed by a plurality of resistors.

With reference to the first aspect, in a seventh embodiment, the first switch unit includes a switching transistor and a relay that are connected in parallel. The switching transistor can implement fast turn-on and turn-off, and has high control sensitivity and a low latency. In addition, the relay has a strong current resistance capability. Therefore, after the switching transistor is connected in parallel to the relay, in addition to implementing low-latency control, the first switch unit is enabled to have a strong current resistance capability, and can match a cell pack with a large output current.

With reference to the first aspect, in an eighth embodiment, the sampling unit includes a sampling resistor, and the sampling signal is a voltage at both terminals of the sampling resistor or a current flowing through the sampling resistor.

According to a second aspect, this application further provides a battery connection status detection method, applied to the battery connection status detection circuit according to any one of the foregoing implementations. The battery connection status detection circuit is disposed in a battery, and the battery includes a cell pack. The method includes: controlling the first switch unit and the second switch unit, and determining, based on a sampling signal obtained from the sampling unit, whether the battery is connected.

With reference to the second aspect, in an embodiment, the controlling the first switch unit and the second switch unit, and determining, based on a sampling signal obtained from the sampling unit, whether the battery is connected includes:

first controlling both the first switch unit and the second switch unit to be closed, then controlling the first switch unit to be opened for a preset time period, and determining, based on sampling signals obtained from the sampling unit before and after the preset time period, whether the battery is connected.

With reference to the second aspect, in a second embodiment, the sampling signal is a voltage at both terminals of the energy storage unit, and the determining, based on sampling signals obtained from the sampling unit before and after the preset time period, whether the battery is connected includes: determining, based on a difference of the voltages obtained before and after the preset time period, whether the battery is connected.

With reference to the second aspect, in a third embodiment, the determining, based on sampling signals obtained from the sampling unit before and after the preset time period, whether the battery is connected includes: determining a detected value of an electrical parameter of the energy storage unit by using the sampling signals obtained before and after the preset time period, and comparing the detected value with a preset electrical parameter value to determine whether the battery is connected.

With reference to the second aspect, in a fourth embodiment, the electrical parameter is a capacitance.

According to a third aspect, this application further provides a battery, including the battery connection status detection circuit according to any one of the foregoing implementations, and further including a cell pack. A first terminal of the cell pack is connected to the first terminal of the first switch unit, and a second terminal of the cell pack is connected to the second terminal of the first switch unit by using the energy storage unit. The cell pack is configured to provide electric energy. The battery provided in this application may be used in a communication energy system such as an indoor communication energy system, an outdoor communication energy system, a communication energy system for an equipment room, or a communication energy system with hybrid power supply. The battery may be a lithium battery or a lead acid battery.

According to a fourth aspect, this application further provides an electronic device, including the battery connection status detection circuit according to any one of the foregoing implementations, and further including a cell pack and a load circuit. The cell pack is configured to provide electric energy to the load circuit. The electronic device may be a mobile phone, a notebook computer, a wearable electronic device (such as a smart watch), a tablet computer, an augmented reality (AR) device, a virtual reality (VR) device, or the like.

According to a fifth aspect, this application further provides an energy system, including at least one battery according to the foregoing implementation and at least one power supply unit PSU. The battery and the power supply unit are connected in parallel to a direct current bus of the energy system, and each power supply unit is further connected in parallel to one energy storage unit. The power supply unit is configured to convert an alternating current provided by an external power supply into a direct current, and then transmit the direct current to the direct current bus of the energy system.

With reference to the fifth aspect, in a first embodiment, the controller is further configured to determine, based on a difference of voltages at both terminals of the energy storage unit obtained before and after a preset time period, a sum of quantities of batteries and PSUs that are connected in parallel to the direct current bus.

When different quantities of batteries and power supply units are connected, a corresponding difference of voltages before and after the preset time period may be pre-calibrated, that is, a calibration value may be pre-obtained. Then, the controller determines a detected value of the difference of the voltages before and after the preset time period, and compares the detected value with the calibration value to determine a quantity of connected power supply units.

With reference to the fifth aspect, in a second embodiment, the controller is further configured to determine, based on sampling signals obtained before and after the preset time period, an equivalent value of an electrical parameter obtained after all the energy storage units are connected in parallel, and determine, based on the equivalent value, a sum of quantities of batteries and PSUs that are connected in parallel to the direct current bus.

When different quantities of batteries and power supply units are connected, a corresponding equivalent value of the electrical parameter of the energy storage units may be pre-calibrated, that is, a calibration value may be obtained. Then, the controller determines a current detected value of the electrical parameter, and compares the detected value with the calibration value to determine a quantity of connected power supply units.

DESCRIPTION OF EMBODIMENTS

Figure 1:
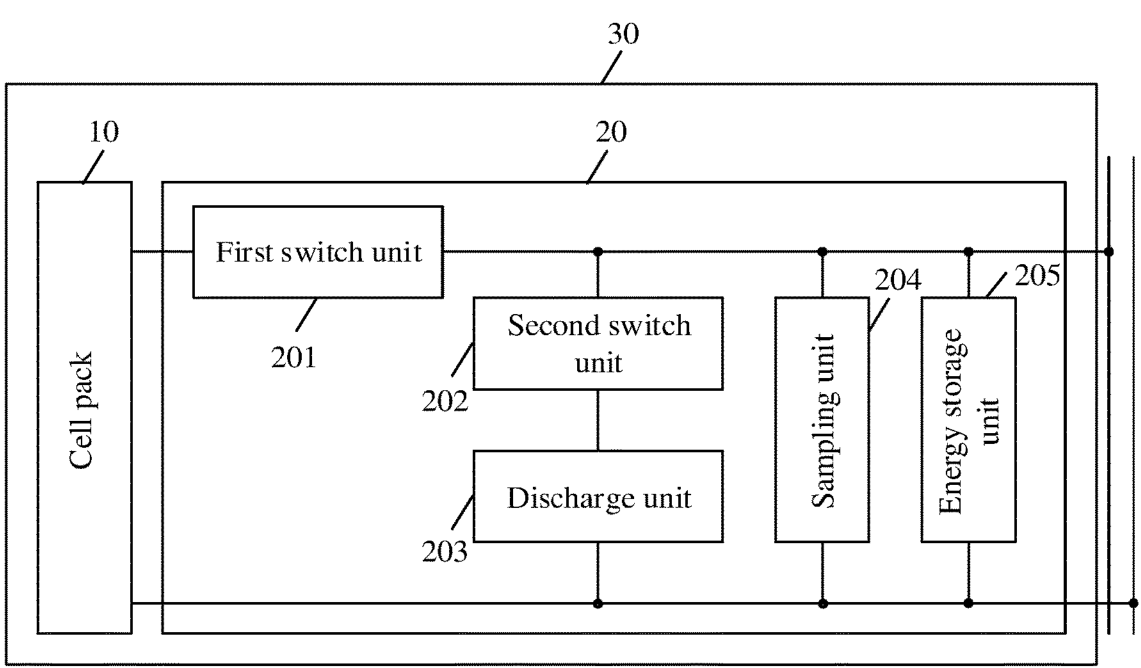
FIG. 1 is a diagram of a battery connection status detection circuit according to an embodiment of this application.

To enable a person skilled in the art to better understand the technical solutions provided in the embodiments of this application, the following first describes an application scenario of the technical solutions provided in this application.

Currently, with rapid 5G development, power consumption of a communication site is multiplied, and an energy storage system with higher energy density is needed. Because a lithium battery has a cycle life five times that of a lead acid battery and a float charging life two times that of the lead acid battery, life cycle costs of the lithium battery are already less than those of the lead acid battery. Therefore, the lithium battery is gradually widely used in a communication energy system. The communication energy system may be an indoor communication energy system, an outdoor communication energy system, a communication energy system for an equipment room, a communication energy system with hybrid power supply, or the like.

In addition, lithium batteries are also widely used in existing electronic devices. In this application, a type of an electronic device is not limited. The electronic device may be a mobile phone, a notebook computer, a wearable electronic device (such as a smart watch), a tablet computer, an augmented reality device, a virtual reality device, or the like.

For example, when a lithium battery is used in an energy system of a site, for a direct current bus of a site device, an energy storage system and a power supply unit (PSU) are usually connected in parallel. The power supply unit is configured to convert an alternating current provided by an external power supply into a direct current and supply the direct current to the site device. The power supply unit may further charge a lithium battery in the energy storage system. However, a port of the energy storage system is connected in parallel to a port of the power supply unit. Consequently, it is difficult to distinguish whether a port voltage is maintained by discharging of the lithium battery or by the power supply unit.

To resolve the foregoing technical problem, this application provides a battery connection status detection circuit and method, a power supply device, and an electronic device. First, a cell pack is controlled to supply power to an energy storage unit. Then, the cell pack is controlled to stop supplying power. Afterwards, the energy storage unit is controlled to discharge by using a discharge unit. A voltage drop rate of the energy storage unit varies with two states of a battery: a connected state and an islanding state. Therefore, a current connection status of the battery is determined based on a sampling result of a voltage at both terminals of the energy storage unit. The detection circuit may be controlled by a controller to actively perform detection, and may be closed when detection is not needed. Therefore, no additional loss is caused.

To enable a person skilled in the art to understand the solutions of this application more clearly, the following describes the technical solutions in the embodiments of this application with reference to the accompanying drawings in the embodiments of this application.

The terms such as “first” and “second” in the description of this application are used only for the purpose of description and cannot be understood as indicating or implying relative importance or implicitly indicating a quantity of technical features indicated.

In this application, unless otherwise expressly specified and limited, the term “connection” should be understood in a broad sense. For example, “connection” may be a fixed connection, may be a detachable connection, or may be a connection to form a whole. The connection may be a direct connection, or an indirect connection through an intermediate medium.

Apparatus Embodiment 1

An embodiment of this application provides a battery connection status detection circuit. The apparatus may be used in a battery energy storage system of a communication site or the like, or used in an electronic device that uses a battery for a power supply. The following describes the apparatus with reference to the accompanying drawings.

FIG. 1 is a diagram of a battery connection status detection circuit according to an embodiment of this application.

A detection circuit 20 is disposed in a battery. The detection circuit 20 includes a first switch unit 201, a second switch unit 202, a discharge unit 203, a sampling unit 204, an energy storage unit 205, and a controller (not shown in the figure).

A first terminal of the first switch unit 201 is connected to a first terminal of a cell pack 10. A second terminal of the first switch unit 201 is connected to a second terminal of the cell pack 10 after being connected in series to the energy storage unit 205. If the first terminal of the cell pack 10 is a positive output terminal, the second terminal of the cell pack 10 is a negative output terminal. If the first terminal of the cell pack 10 is a negative output terminal, the second terminal of the cell pack 10 is a positive output terminal.

A battery 30 includes the cell pack 10 and the battery connection status detection circuit 20.

The second switch unit 202 is connected in parallel to the energy storage unit 205 after being connected in series to the discharge unit 203.

The discharge unit 203 is configured to discharge the energy storage unit 205.

The sampling unit 204 is connected in parallel to the energy storage unit 205. The sampling unit 204 sends an obtained sampling signal to the controller.

The controller is configured to control working statuses of the first switch unit 201 and the second switch unit 202, and determine a connection status of the battery based on the obtained sampling signal.

The first switch unit 201 and the second switch unit 202 each may include a controllable switching transistor. A type of the controllable switching transistor is not limited in this embodiment of this application. For example, the controllable switching transistor may be an insulated gate bipolar transistor (IGBT), a metal oxide semiconductor field effect transistor (MOSFET, MOS transistor for short), a SiC MOSFET (silicon carbide metal oxide semiconductor field effect transistor), or a relay.

The controller may send a PWM (pulse width modulation) signal to the switching transistor to control a working status of the controllable switching transistor.

The controller may be an application-specific integrated circuit (ASIC), a programmable logic device (PLD), a digital signal processor (DSP), or a combination thereof. The PLD may be a complex programmable logic device (CPLD), a field programmable gate array (FPGA), generic array logic (GAL), or any combination thereof. This is not limited in this embodiment of this application.

In some embodiments, the controller may be disposed independently. In some other embodiments, the controller may be integrated with a controller of a BMS.

In conclusion, the controller of the detection circuit provided in this embodiment of this application can enable, by controlling the working statuses of the first switch unit and the second switch unit, the discharge unit to discharge the energy storage unit. When the battery is in a connected state (connected to a system), the energy storage unit is connected to the discharge unit and an external power supply unit, and a voltage drops slowly. When the battery is in an islanding state (disconnected from a system), the energy storage unit is discharged by the discharge unit, and the voltage of the energy storage unit drops fast. Therefore, a voltage at both terminals of the energy storage unit changes at different speeds in different connection states. The sampling unit and the energy storage unit are connected in parallel, and a change of a voltage signal obtained by the sampling unit may represent a change of the voltage at both terminals of the energy storage unit. Therefore, the controller can determine a current connection status of the battery based on the sampling signal of the sampling unit. The detection circuit may be controlled by the controller to actively perform detection. The first switch unit and the second switch unit may be opened when detection is not needed. Therefore, no additional loss is caused.

The following describes a working manner of the controller.

The controller first controls both the first switch unit 201 and the second switch unit 202 to be closed. In this case, the cell pack 10 charges the energy storage unit 205. When the battery is connected, the energy storage unit 205 is further connected to another power supply unit of the system. Therefore, the voltage of the energy storage unit 205 is maintained by both the cell pack and the another power supply unit.

An implementation of the energy storage unit 205 is not limited in this embodiment of this application. In some embodiments, the energy storage unit 205 may include one capacitor or a plurality of capacitors connected in series or in parallel.

The controller then controls the first switch unit 201 to be opened for a preset time period, and the discharge unit 203 discharges the energy storage unit 205 within the preset time period. The preset time may be set based on an actual situation. This is not limited in this embodiment of this application. In a preferred embodiment, the preset time period may be set as a short time period, for example, may be set to a microsecond level, so as to implement fast connection status detection.

The controller obtains a sampling signal of the sampling unit 204, and determines a connection status of the battery 30 based on sampling results of the sampling unit 204 obtained before and after the preset time period. This is described in the following.

When the battery 30 is in the connected state, the energy storage unit 205 is discharged by the discharge unit 203 after normal energy storage. However, because the energy storage unit 205 is further connected to an external power supply unit (such as a PSU) and the external power supply unit can maintain a voltage at both terminals of the energy storage unit 205, the voltage at both terminals of the energy storage unit 205 drops slowly. As a result, the voltage at both terminals of the energy storage unit 205 does not significantly change before and after the discharge. Further, the sampling unit 204 is connected in parallel to the energy storage unit 205. Therefore, a change of a voltage signal collected by the sampling unit 204 may be used to represent a voltage change of the energy storage unit 205.

When the battery 30 is disconnected, because the energy storage unit 205 is discharged only by the discharge unit 203, and is disconnected from an external power supply unit, the voltage at both terminals of the energy storage unit 205 changes slowly after discharging for the preset time period. The voltage at both terminals of the energy storage unit 205 drops fast with a large drop amount before and after the preset time period.

In some embodiments, the cell pack 10 may be a lithium battery. When determining that the lithium battery is disconnected, the controller may further control the lithium battery to enter a standby state, so as to avoid a loss of self-power consumption. In some other embodiments, the cell pack 10 may further be another type of battery, such as a lead acid battery. This is not limited in this embodiment of this application.

In conclusion, the controller of the battery connection status detection circuit first controls both the first switch unit and the second switch unit to be closed. Then, the controller controls the first switch unit to be opened for the preset time period, so that the discharge unit discharges the energy storage unit. When the battery is connected or disconnected, a voltage at both terminals of the energy storage unit changes at different speeds before and after the preset time period, and therefore the controller can determine a current connection status of the battery based on the obtained sampling signal. In addition, the preset time period may be adjusted based on an actual requirement, for example, may be set to a time length of a microsecond level, so as to implement fast battery connection status detection.

Apparatus Embodiment 2

The following describes a working principle of a connection status detection circuit with reference to an implementation of the connection status detection circuit.

Figure 2:
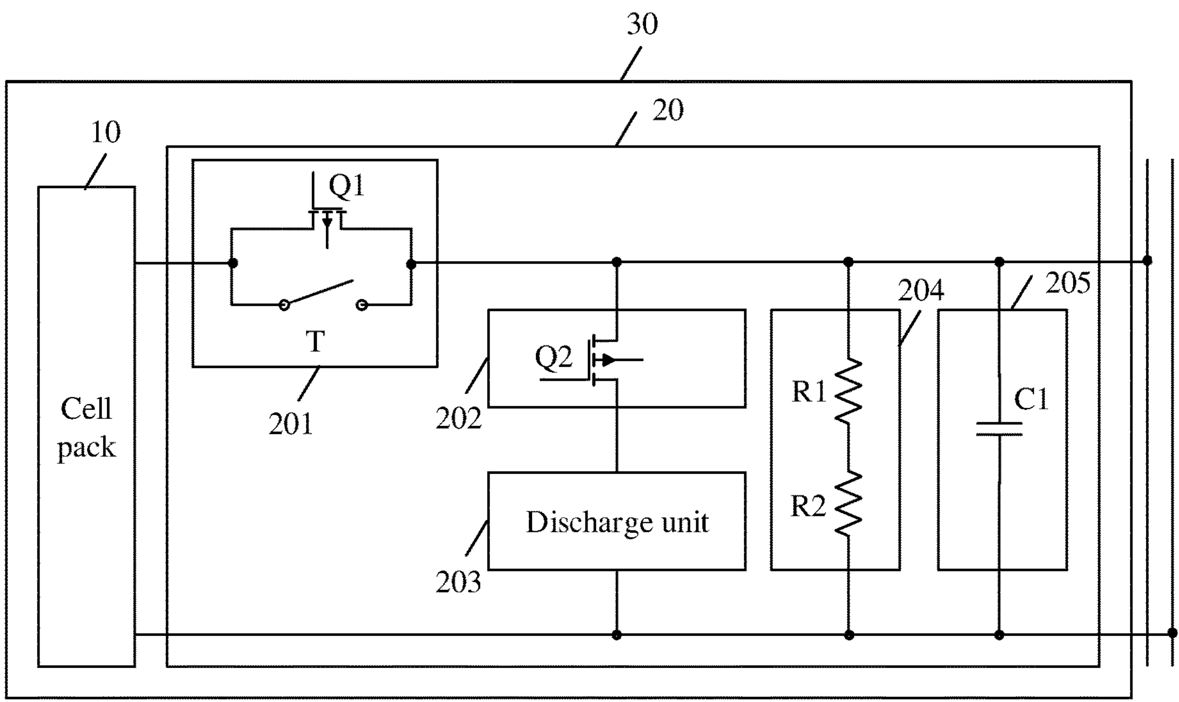
FIG. 2 is a diagram of another battery connection status detection circuit according to an embodiment of this application.

FIG. 2 is a diagram of another battery connection status detection circuit according to an embodiment of this application.

A first switch unit 201 of a detection circuit 20 provided in this embodiment of this application includes a switching transistor Q1 and a relay T that are connected in parallel. In this embodiment of this application, an example in which the switching transistor Q1 is a MOS transistor (and is more specifically an NMOS transistor) is used for description. A principle is similar when the switching transistor Q1 is another type of controllable switching transistor. A drain of the switching transistor Q1 is a first terminal of the first switch unit 201, and is configured to connect to a first terminal of the cell pack 10. A source of the switching transistor Q1 is a second terminal of the first switch unit 201, and is configured to connect to an energy storage unit 205. A gate of the switching transistor Q1 is a control terminal, and a controller controls a working status of the switching transistor Q1 by sending a PWM signal to the control terminal of the switching transistor Q1.

The switching transistor Q1 in the first switch unit 201 can implement fast turn-on and turn-off, and has high control sensitivity and a low latency. In addition, the relay T has a strong current resistance capability. Therefore, after the switching transistor Q1 is connected in parallel to the relay T, in addition to implementing low-latency control, the first switch unit 201 has a strong current resistance capability, and can match a cell pack 10 with a large output current.

A second switch unit 202 in this embodiment of this application may include a switching transistor Q2. In this embodiment of this application, an example in which the switching transistor Q2 is also an NMOS transistor is used for description. A principle is similar when the switching transistor Q2 is another type of controllable switching transistor. A drain of the switching transistor Q2 is a first terminal of the second switch unit 202, and is configured to connect to the second terminal of the first switch unit 201. A source of the switching transistor Q2 is a second terminal of the second switch unit 202, and is configured to connect to a discharge unit 203. A gate of the switching transistor Q2 is a control terminal, and the controller controls a working status of the switching transistor Q2 by sending a PWM signal to the control terminal of the switching transistor Q2.

The discharge unit 203 in this embodiment of this application is a load circuit, and is configured to consume electric energy to discharge the energy storage unit 205.

In some embodiments, the energy storage unit 205 includes a resistor. The resistor may be a separately disposed resistor, or may be a resistor network (in which a plurality of resistors are connected in series or in parallel). This is not limited in this embodiment of this application.

In some other embodiments, the energy storage unit 205 includes a heating film circuit. The heating film circuit is configured to convert electric energy into thermal energy, so as to heat the battery, thereby improving working performance of the battery in a low temperature environment. When the energy storage unit 205 is discharged by using the heating film circuit, consumed electric energy may be converted into thermal energy instead of being entirely wasted, so as to improve the working performance of the battery. The heating film circuit in the energy storage unit 205 may be separately disposed, or a heating film in a current battery system may be reused, to reduce a quantity of used components and simplify a circuit structure.

A sampling unit 204 in this embodiment of this application includes a sampling resistor. A sampling signal is a voltage at both terminals of the sampling resistor, or a current flowing through the sampling resistor. The sampling unit 204 shown in the figure includes resistors R1 and R2 connected in series. For example, the resistor R1 is a sampling resistor. The resistor R1 may be one separately disposed resistor, or may be an equivalent resistor of a plurality of resistors connected in series or in parallel. The resistor R2 may be one separately disposed resistor, or may be an equivalent resistor of a plurality of resistors connected in series or in parallel. This is not limited in this embodiment of this application.

The resistor R2 is configured to limit a current of the sampling unit 204, to protect the circuit, and is further configured to divide a voltage, to limit a voltage at both terminals of the sampling resistor R1, so that the voltage is not excessively high. In some embodiments, the voltage at both terminals of the sampling resistor R1 may be obtained by using a voltage sensor, and an obtained voltage signal is sent to the controller. In some other embodiments, a current flowing through the sampling resistor R1 may be obtained by using a current sensor, and an obtained current signal is sent to the controller.

The energy storage unit 205 provided in this embodiment of this application is configured to store energy. The energy storage unit 205 may include one energy storage capacitor or a plurality of energy storage capacitors connected in series or in parallel. For ease of description, an example in which the energy storage unit 205 is an energy storage capacitor C1 is used for description in the following embodiments. When the energy storage unit 205 includes a plurality of energy storage capacitors, C1 may be understood as an equivalent capacitor of the plurality of energy storage capacitors.

The sampling circuit 204 is connected in parallel to both terminals of the energy storage unit 205. Therefore, a voltage division change of the sampling resistor R1 represents a change of a voltage at both terminals of the energy storage unit. The following describes a detection principle of the controller. In the following description, an example in which the sampling signal is a voltage signal is used for description. When the sampling signal is a current signal, because a resistance of the sampling resistor R1 is a known parameter, the controller may obtain the voltage at both terminals of the sampling resistor R1 based on the resistance of the sampling resistor R1 and the current signal.

The following first describes a principle in which the controller determines a connection status of the battery based on a difference of voltages at both terminals of the energy storage unit obtained before and after a preset time period.

Figure 3:
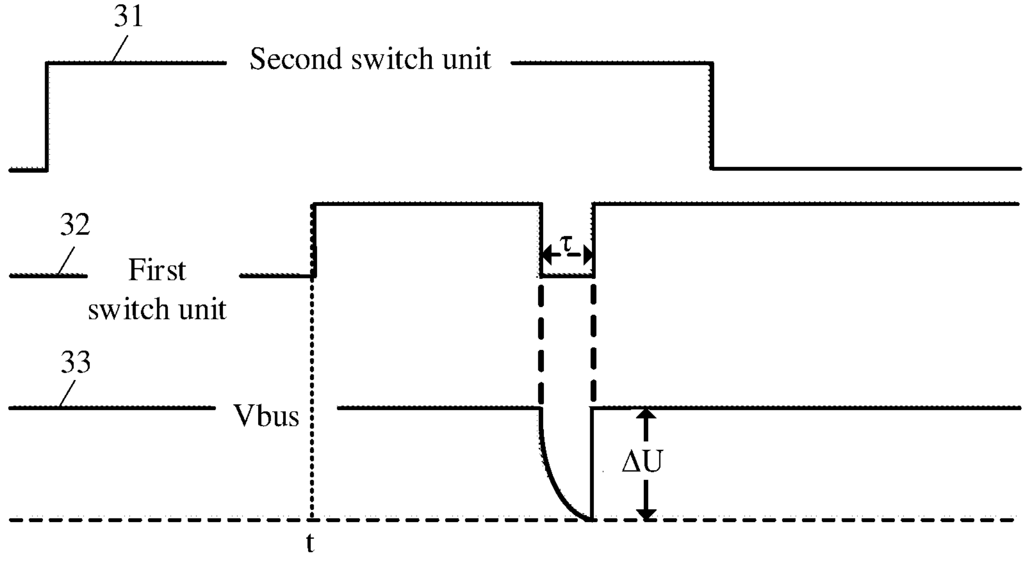
FIG. 3 is a diagram of a signal waveform according to an embodiment of this application.

FIG. 3 is a diagram of a signal waveform according to an embodiment of this application.

An example in which the switching transistors Q1 and Q2 are NMOS transistors is still used for description. When control signals input by the controller to gates of the NMOS transistors are at high levels, the NMOS transistors are turned on.

A waveform 31 in FIG. 3 is a waveform of a control signal from the controller to the second switch unit 202, i.e., to the switching transistor Q2. When the waveform 31 is at a high level, the switching transistor Q2 is turned on. When the waveform 31 is at a low level, the switching transistor Q2 is turned off.

A waveform 32 in FIG. 3 is a waveform of a control signal from the controller to the first switch unit 201, i.e., to the switching transistor Q1 and the relay T. When the waveform 32 is at a high level, the switching transistor Q1 and the relay T are turned on. When the waveform 32 is at a low level, the switching transistor Q2 and the relay T are turned off.

A waveform 33 in FIG. 3 is a waveform of a bus voltage Vbus of the detection circuit, that is, the voltage at both terminals of the energy storage unit.

The controller controls the switching transistor Q2 to be closed, so that the discharge unit 203 is connected to the circuit, and controls the switching transistor Q1 and the relay T to be closed, so that the energy storage capacitor C1 is connected to the circuit.

When a battery 30 is connected, the cell pack 10 normally supplies power to the energy storage capacitor C1 after a moment t shown in the figure, the energy storage capacitor C1 can be normally charged, and a voltage of the energy storage capacitor C1 is maintained by both the cell pack 10 and an external power supply unit connected to the battery.

The resistance of the sampling resistor R1 and a resistance of the resistor R2 are known parameters, and may be pre-obtained and stored in a memory, so that the resistances can be invoked when needed for use by the controller.

Based on the voltage $U_{R1}$ at both terminals of the sampling resistor R1, the resistance of the sampling resistor R1, and the resistance of the resistor R2 that are obtained, the controller obtains a voltage $U_{C1}$ at both terminals of the energy storage unit 205. For details, refer to the following formula:

$$U_{C1}=U_{R1}\times(1+R2/R1) \tag{1}$$

Then, the controller controls the first switch unit 201 to be opened for a preset time period $\tau$. In this case, the discharge unit 203 discharges the energy storage unit 205, and the voltage of the energy storage unit 205 drops in the preset time period $\tau$. After the preset time period $\tau$, a voltage at both terminals of the sampling resistor R1 that is obtained by the controller is $U_{R1}'$. A voltage at both terminals of the energy storage unit 205 after the preset time period $\tau$ is $U_{C1}'$. Therefore, a voltage drop value $\Delta U$ may be determined by using the following formulas:

$$U_{C1}'=U_{R1}'\times(1+R2/R1) \tag{2}$$

$$\Delta U=U_{C1}-U_{C1}' \tag{3}$$

$\Delta U$ is a voltage drop value occurring when the battery is connected normally, and the voltage drop value may be used as a criterion for determining the connection status of the battery.

When the battery is in a connected state (connected to a system), the energy storage capacitor C1 is connected to the discharge unit and the external power supply unit within the preset time period $\tau$ for which the first switch unit 201 is opened. Therefore, the voltage drops slowly, that is, $\Delta U$ is small.

When the battery is disconnected, the energy storage capacitor C1 is discharged by the discharge unit 203, the energy storage capacitor C1 is disconnected in parallel to an external power supply unit, and the voltage at both terminals of the energy storage capacitor C1 is maintained only by the cell pack. Consequently, after the first switch unit is opened, the energy storage capacitor C1 is discharged only by the discharge unit, and a voltage drop of the energy storage unit 205 after the same preset time period $\tau$ is greater than or equal to the theoretical voltage drop value $\Delta U$. Therefore, it can be determined that the battery is in a disconnected state currently.

In consideration of impact of a measurement error or another factor in actual application, in some embodiments, the voltage drop value $\Delta U$ and an allowed error range may be pre-calibrated based on tests and experiments. When determining that a current voltage drop value is greater than or equal to $\Delta U$, and an error exceeds the allowed error range, the controller determines that the battery is in the disconnected state.

The following describes a principle that the controller determines the connection status of the battery based on an electrical parameter of the energy storage unit that is obtained from a sampling signal.

The controller is configured to determine a detected value of the electrical parameter of the energy storage unit 205 based on sampling signals obtained before and after the preset time period, and compare the detected value with a preset electrical parameter value to determine the connection status of the battery.

An example in which the sampling signal is a voltage signal is still used for description. A capacitance of the energy storage capacitor of the energy storage unit 205 is C1, that is, in this case, the electrical parameter is a capacitance. The capacitance C1 is the preset electrical parameter value, is pre-determined and stored in a memory, and is invoked when it needs to be used.

A process of controlling the first switch unit 201 and the second switch unit 202 by the controller is the same as that described above. Details are not described herein in this embodiment of this application. For ease of description, for example, $R_h$ is used to represent a resistance of the discharge unit 203 below. When the discharge unit is a resistor, $R_h$ is a resistance of the resistor. When the discharge unit is a heating film circuit, $R_h$ is an equivalent resistance of the heating film circuit.

When the battery 30 is connected, voltages at both terminals of the energy storage unit 205 before and after discharge are $U_{C1}$ and $U_{C1}'$ before and after discharge. According to a discharge principle of an RC circuit, the following formulas are satisfied:

$$U_{C1}'=U_{C1}\times(1-e^{-\tau/\tau_{RC}}) \tag{4}$$

$$\tau_{RC}=R_h\times C_0 \tag{5}$$

$\tau_{RC}$ is a discharge time constant of an RC port, and $C_0$ is the detected value of the electrical parameter.

For the controller, $U_{C1}$, $U_{C1}'$, $R_h$, and $\tau$ each are a known constant. Therefore, the following can be obtained based on the foregoing formulas:

$$U_{C1}'=U_{C1}\times(1-e^{-\tau/(R_h\times C_0)}) \tag{6}$$

$$C_0=-\tau/[R_h\ \ln(1-U_{C1}'/U_{C1})] \tag{7}$$

When the battery 30 is connected, the energy storage capacitor is connected in parallel to a bus capacitor of another power supply unit. Therefore, the detected value $C_0$ of the electrical parameter is an equivalent value of all the capacitors connected in parallel.

When the battery 30 is disconnected, the energy storage capacitor is disconnected in parallel to a bus capacitor of another power supply unit. Therefore, the detected value $C_0$ of the electrical parameter corresponds to a capacitance of the energy storage capacitor C1.

It is known that the capacitance of the energy storage capacitor of the energy storage unit 205 is $C_1$. When $C_0$ meets $C_1-\delta\leq C_0\leq C_1+\delta$, it indicates that the battery 30 is disconnected in this case. The obtained detected value $C_0$ of the electrical parameter corresponds to the capacitance of the energy storage capacitor C1, where $\delta$ is a preset error value. Otherwise, it indicates that the battery 30 is connected normally in this case.

In conclusion, the controller of the detection circuit provided in this embodiment of this application can obtain, based on the sampling signals obtained before and after the preset time period, the difference of the voltages the energy storage unit obtained before and after the preset time period. When the voltage difference is greater than or equal to a preset voltage difference, the controller determines that the battery is disconnected. Alternatively, the detected value of the electrical parameter of the energy storage unit may be determined based on the sampling signals obtained before and after the preset time period, and the detected value is compared with the preset electrical parameter value to determine the connection status of the battery. The detection circuit may be controlled by the controller to actively perform detection, and can implement turn-on and turn-off randomly. Therefore, no additional loss is caused. In addition, the preset time period may be adjusted based on an actual requirement, for example, may be set to a time length of a microsecond level, so as to implement fast battery connection status detection. When the discharge unit of the apparatus is the heating film circuit, because a resistance of the heating film circuit is high, power consumption is high, and a voltage drop speed of the energy storage unit is high. Therefore, detection sensitivity can be further improved.

Apparatus Embodiment 3

The following continues to describe a detection principle of the detection circuit with reference to an application scenario. In this embodiment of this application, an example in which the detection circuit is used in an energy system of a site device is used for description. The site device may be an indoor communication site device, an outdoor communication site device, a communication site device in an equipment room, a communication site device with hybrid power supply, or the like.

Figure 4:
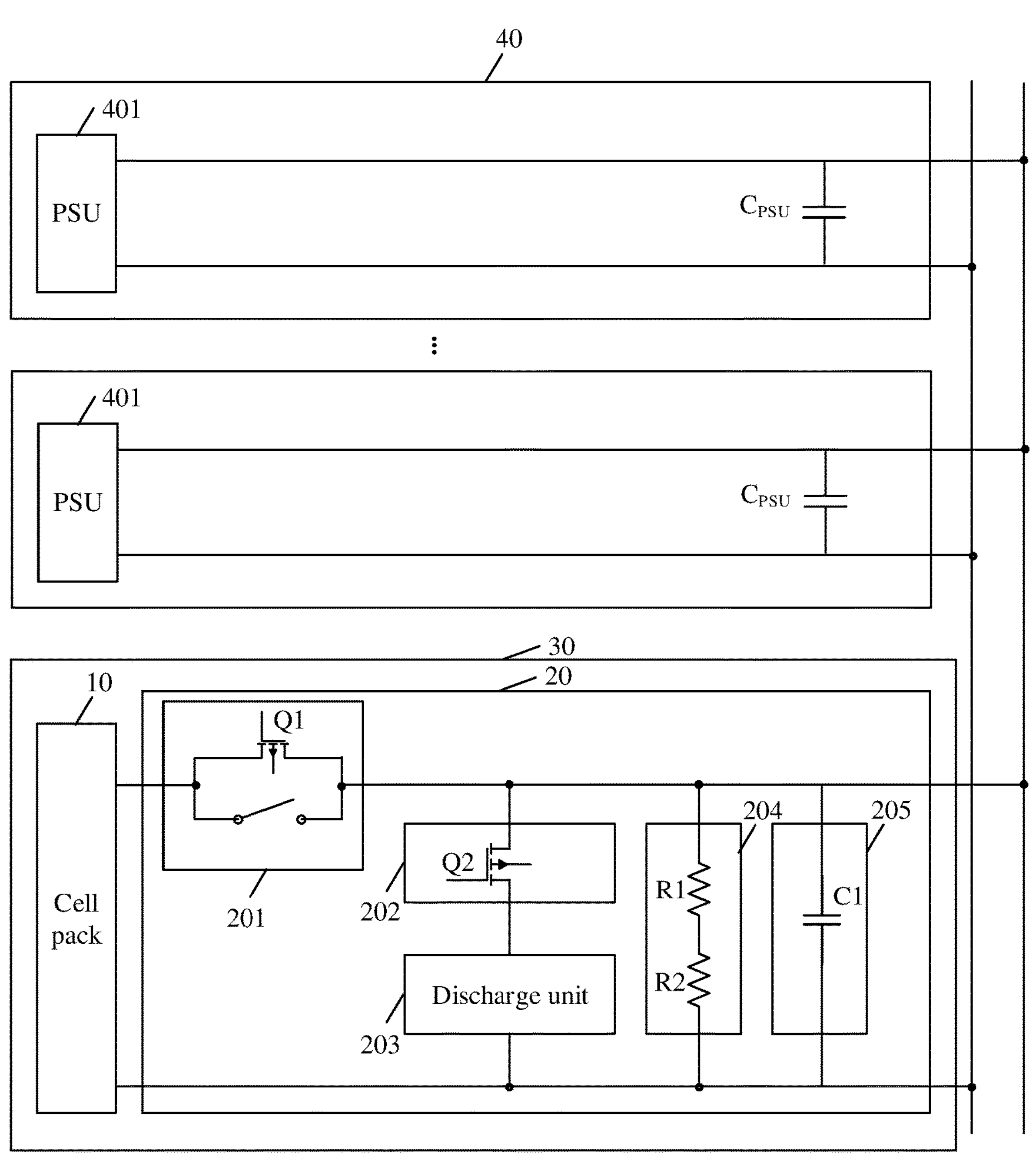
FIG. 4 is a diagram of still another battery connection status detection circuit according to an embodiment of this application.

FIG. 4 is a diagram of another battery connection status detection circuit according to an embodiment of this application.

A battery 30 is connected to a direct current bus of a site device after being connected in parallel to at least one PSU module 40.

The battery 30 includes a cell pack 10 and a battery connection status detection circuit 20.

The PSU module 40 includes PSUs 401 connected in parallel and energy storage units $C_{PSU}$ connected in parallel. The energy storage unit $C_{PSU}$ of the PSU module 40 may have a same implementation as that of an energy storage unit 205 of the detection circuit. In this embodiment of this application, an example in which $C_{PSU}$ is an energy storage capacitor is used for description.

The PSU module 40 of the site device may convert an alternating current into a direct current, and then transmit the direct current to the direct current bus. When the PSU module 40 does not work, the battery 30 may supply power to the direct current bus.

The following describes a method for detecting, by using the detection circuit, a quantity of modules connected to the direct current bus.

A controller may determine, based on a difference of voltages at both terminals of the energy storage unit obtained before and after a preset time period, the quantity of modules connected to the direct current bus.

Still referring to formula (3) above, $\Delta U$ corresponding to different quantities of connected modules may be pre-calibrated based on tests and experiments. For example, when the quantity of modules connected to the direct current bus is 2 (the battery and one PSU module are connected to the direct current bus), a corresponding voltage drop value is $\Delta U_1$. When the quantity of modules connected to the direct current bus is 3 (the battery and two PSU modules are connected to the direct current bus), a corresponding voltage drop value is $\Delta U_2$. Then, allowed error ranges are separately determined, that is, a plurality of intervals of the voltage drop value may be pre-obtained. The plurality of obtained intervals are stored in a memory, so that the intervals can be invoked when needed for use by the controller.

Then, the controller performs detection to obtain a detected value of a voltage drop value of voltages obtained before and after a preset time period $\tau$, and then determines an interval in which the detected value is located, so as to determine the corresponding quantity of modules connected to the direct current bus.

The controller may determine an equivalent capacitance of energy storage units connected in parallel based on a sampling signal, so as to determine the quantity of modules connected to the direct current bus.

Different quantities of connected modules correspond to different quantities of energy storage capacitors connected in parallel. Therefore, corresponding energy storage capacitors have different equivalent capacitances. Pre-calibration may be performed based on tests and experiments. For example, when the quantity of modules connected to the direct current bus is 2 (the battery and one PSU module are connected to the direct current bus), an equivalent capacitance of the corresponding energy storage capacitors is $C_{11}$. When the quantity of modules connected to the direct current bus is 3 (the battery and two PSU modules are connected to the direct current bus), an equivalent capacitance of the corresponding energy storage capacitors is $C_{12}$. Then, allowed error ranges are separately determined, that is, a plurality of intervals of the equivalent capacitance may be pre-obtained. The plurality of obtained intervals are stored in a memory, so that the intervals can be invoked when needed for use by the controller.

Still referring to formula (7) above, an equivalent capacitance interval in which a detected value $C_0$ of the equivalent capacitance is located is determined, so as to determine the corresponding quantity of modules connected to the direct current bus.

Figure 5:
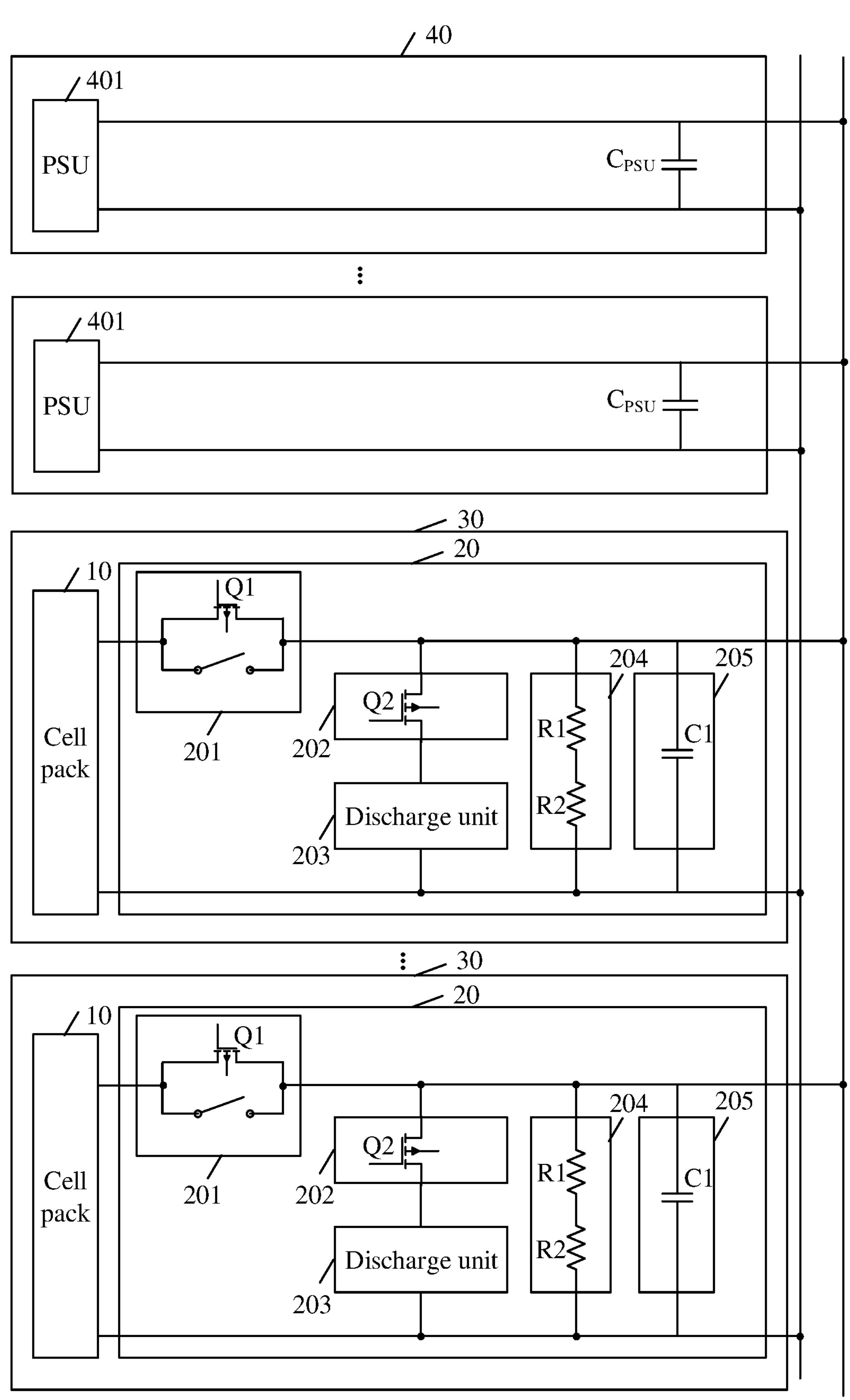
FIG. 5 is a diagram of yet another battery connection status detection circuit according to an embodiment of this application.

FIG. 5 is a diagram of still another battery connection status detection circuit according to an embodiment of this application.

A difference between FIG. 5 and FIG. 4 lies in that a plurality of batteries 30 and at least one PSU are connected in parallel to the direct current bus. In this case, the controller may determine, based on a voltage difference, a sum of quantities of batteries and PSUs that are connected in parallel to the direct current bus. Alternatively, an equivalent capacitance of energy storage units connected in parallel is determined based on sampling signals obtained by the sampling unit before and after the preset time period. Further, the sum of quantities of batteries and PSUs that are connected in parallel to the direct current bus is determined based on the equivalent capacitance. An implementation is similar to the foregoing description, and details are not described herein in this embodiment of this application.

In conclusion, when the battery and the at least one power supply unit are connected in parallel to the direct current bus, or the plurality of batteries and the at least one power supply unit are connected in parallel to the direct current bus, the controller of the detection circuit may determine, based on the difference of the voltages at both terminals of the energy storage unit obtained before and after the preset time period, the quantity of modules connected to the direct current bus, or determine the equivalent capacitance of the energy storage units connected in parallel based on the sampling signal, so as to determine the quantity of modules connected to the direct current bus, thereby implementing functional multiplexing.

Method Embodiment

Based on the battery connection status detection circuit provided in the foregoing embodiments, an embodiment of this application further provides a battery connection status detection method, which may be applied to the detection circuit provided in the foregoing embodiments. For description of the detection circuit, refer to the foregoing embodiments. Details are not described herein in this embodiment of this application.

The method provided in this embodiment of this application includes: controlling the first switch unit and the second switch unit, and determining, based on a sampling signal obtained from the sampling unit, whether the battery is connected. The following provides descriptions with reference to the accompanying drawing.

Figure 6:
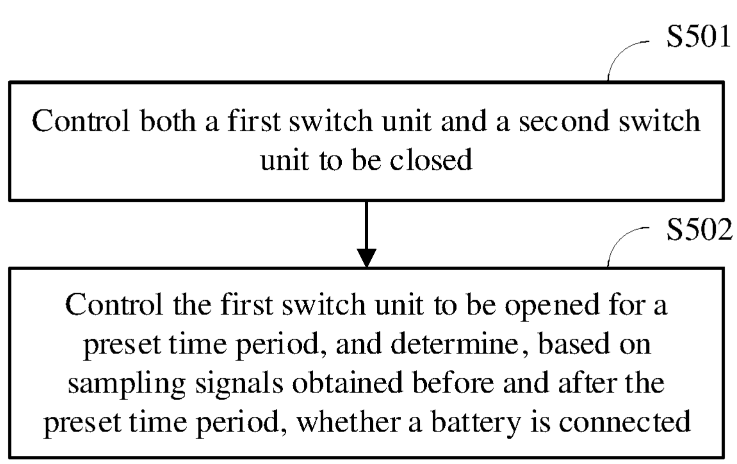
FIG. 6 is a flowchart of a battery connection status detection method according to an embodiment of this application.

FIG. 6 is a flowchart of a battery connection status detection method according to an embodiment of this application.

The method provided in this embodiment of this application includes the following steps.

S501. Control both a first switch unit and a second switch unit to be closed.

S502. Control the first switch unit to be opened for a preset time period, and determine, by using sampling signals obtained before and after a preset time period, whether a battery is connected.

When the battery is connected, an energy storage unit is discharged by a discharge unit after normal energy storage. A voltage at both terminals of the energy storage unit may be further maintained by an external power supply unit. Therefore, the voltage drops slowly. The sampling unit and the energy storage unit are connected in parallel, and a change of a voltage signal collected by the sampling unit may be used to represent a change of the voltage of the energy storage unit.

When the battery is disconnected, because the energy storage unit is disconnected from an external power supply unit, and is discharged only by using the discharge unit, the voltage at both terminals of the energy storage unit drops fast after discharging for the preset time period. The voltage at both terminals of the energy storage unit experiences a large drop amount before and after the preset time period. Therefore, a connection status of the battery may be determined based on sampling results of the sampling unit obtained before and after the preset time period.

S502 may have the following two implementations:

In an embodiment, S502 includes the following steps:

obtaining, based on the sampling signals obtained before and after the preset time period, a difference of voltages of the energy storage unit obtained before and after the preset time period; and when the voltage difference is greater than or equal to a preset voltage difference, determining that the battery is disconnected.

When the battery is disconnected, a voltage drop of the energy storage unit after the preset time period is greater than or equal to a theoretical voltage drop value. In consideration of impact of a measurement error or another factor in actual application, in some embodiments, the voltage drop value and an allowed error range may be pre-calibrated based on tests and experiments. When determining that a current voltage drop value is greater than or equal to the calibrated voltage drop value, and an error exceeds the allowed error range, a controller determines that the battery is in a disconnected state.

Further, when the battery and at least one power supply unit are connected in parallel to a direct current bus, or a plurality of batteries and at least one power supply unit are connected in parallel to the direct current bus (each power supply unit is further connected in parallel to one energy storage unit), a quantity of modules connected to the direct current bus may be further determined based on the difference of the voltages at both terminals of the energy storage unit obtained before and after the preset time period. For a description, refer to Apparatus Embodiment 3. Details are not described herein in this embodiment of this application.

In another embodiment, S502 includes the following steps:

determining a detected value of an electrical parameter of the energy storage unit based on the sampling signals obtained before and after the preset time period; and comparing the detected value with a preset electrical parameter value to determine whether the battery is connected.

For example, the sampling signal is a voltage signal, and the energy storage unit includes an energy storage capacitor, in other words, the electrical parameter is a capacitance. A capacitance of the energy storage capacitor of the energy storage unit is a known parameter, that is, the preset electrical parameter value. A current detected value of the electrical parameter is determined by using formula (7) above. When an error between the detected value of the electrical parameter and the preset electrical parameter value is within an allowed range, it indicates that the battery is in an islanding state. Otherwise, it indicates that the battery is connected normally in this case.

Further, when the battery and a plurality of power supply units are connected in parallel to a direct current bus, or a plurality of batteries and at least one power supply unit are connected in parallel to the direct current bus, where each power supply unit is further connected in parallel to one energy storage unit, an equivalent capacitance of energy storage units connected in parallel may be determined by using the sampling signals obtained by the sampling unit before and after the preset time period. A quantity of power supply units connected in parallel to the direct current bus is determined by using the equivalent capacitance. For a description, refer to Apparatus Embodiment 3. Details are not described herein in this embodiment of this application.

In conclusion, based on the battery connection status detection method provided in this embodiment of this application, both the first switch unit and the second switch unit are first controlled to be closed, and then the first switch unit is controlled to be opened for the preset time period, so that the discharge unit discharges the energy storage unit. When the battery is in a connected state (connected to a system), the energy storage unit is connected to the discharge unit and an external power supply unit, and the voltage drops slowly. When the battery is in the islanding state, the energy storage unit is discharged only by the discharge unit, and the voltage of the energy storage unit drops fast. Therefore, the voltages at both terminals of the energy storage unit obtained before and after the preset time period change differently in different connection states. Further, the sampling unit and the energy storage unit are connected in parallel, and the change of the voltage signal obtained by the sampling unit may represent the change of the voltage of the energy storage unit. Therefore, the controller can determine a current connection status of the battery based on the sampling result. In the detection method, detection may be actively performed, and the first switch unit and the second switch unit may be opened when detection is not needed. Therefore, no additional loss is caused. In addition, the preset time period may be adjusted based on an actual requirement, for example, may be set to a time length of a microsecond level, so as to implement fast battery connection status detection.

Battery Embodiment

Based on the detection circuit provided in the foregoing embodiments, an embodiment of this application further provides a battery. The following describes the battery with reference to the accompanying drawings.

Figure 7:
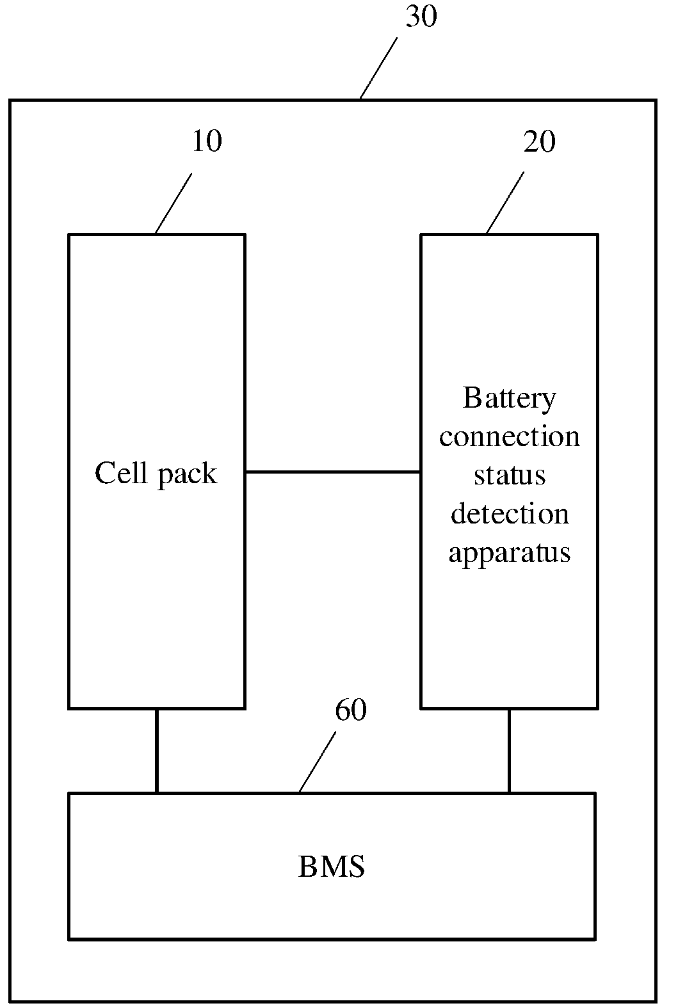
FIG. 7 is a diagram of a battery according to an embodiment of this application.

FIG. 7 is a diagram of a battery according to an embodiment of this application.

The battery 30 includes a cell pack 10, a battery connection status detection circuit 20, and a BMS 30.

A first terminal of the cell pack 10 is connected to a first terminal of a first switch unit. A second terminal of the cell pack 10 is connected to a second terminal of the first switch unit by using an energy storage unit.

The cell pack 10 is configured to provide electric energy. The electric energy is used to supply power to a load circuit of the battery 30. The load may be a next circuit, a power-consuming component, an electronic device, or the like. This is not limited in this embodiment of this application.

For an implementation and a working principle of the battery connection status detection circuit 20, refer to related description in the foregoing embodiments. Details are not described herein in this embodiment of this application.

The BMS 30 is configured to, when the detection circuit 20 determines that the battery is disconnected, control a lithium battery to enter a standby state in time.

A controller of the detection circuit and a controller of the BMS may be integrated, or separately disposed.

The battery 30 in this embodiment of this application may be used in an indoor communication power supply, an outdoor communication power supply, a communication power supply for an equipment room, a communication power supply for hybrid power supply, and the like, and is applicable to small-power sites such as a video surveillance site and a transmission site.

In conclusion, the power supply device provided in this embodiment of this application includes the battery connection status detection circuit. During detection, the controller of the detection circuit first controls both the first switch unit and the second switch unit to be closed. Then, the controller controls the first switch unit to be opened for a preset time period, so that a discharge unit discharges the energy storage unit. When the battery is in a connected state (connected to a system), the energy storage unit is connected to the discharge unit and an external power supply unit, and a voltage drops slowly. When the battery is disconnected, the energy storage unit is discharged by the discharge unit, and the voltage of the energy storage unit drops fast. Therefore, voltages at both terminals of the energy storage unit obtained before and after the preset time period change differently in different connection states. Further, a sampling unit and the energy storage unit are connected in parallel, and a change of a voltage signal obtained by the sampling unit may represent a change of the voltage of the energy storage unit. Therefore, the controller may determine, based on sampling signals of the sampling unit obtained before and after the preset time period, whether the battery is connected currently. The detection circuit may be controlled by the controller to actively perform detection. The first switch unit and the second switch unit may be opened when detection is not needed. Therefore, no additional loss of battery power is caused. In addition, the preset time period may be adjusted based on an actual requirement, for example, may be set to a time length of a microsecond level, so as to implement fast battery connection status detection.

Energy System Embodiment

Based on the battery provided in the foregoing embodiments, an embodiment of this application further provides an energy system. The energy system includes the battery provided in the foregoing embodiments. The following describes the energy system with reference to the accompanying drawings.

Figure 8:
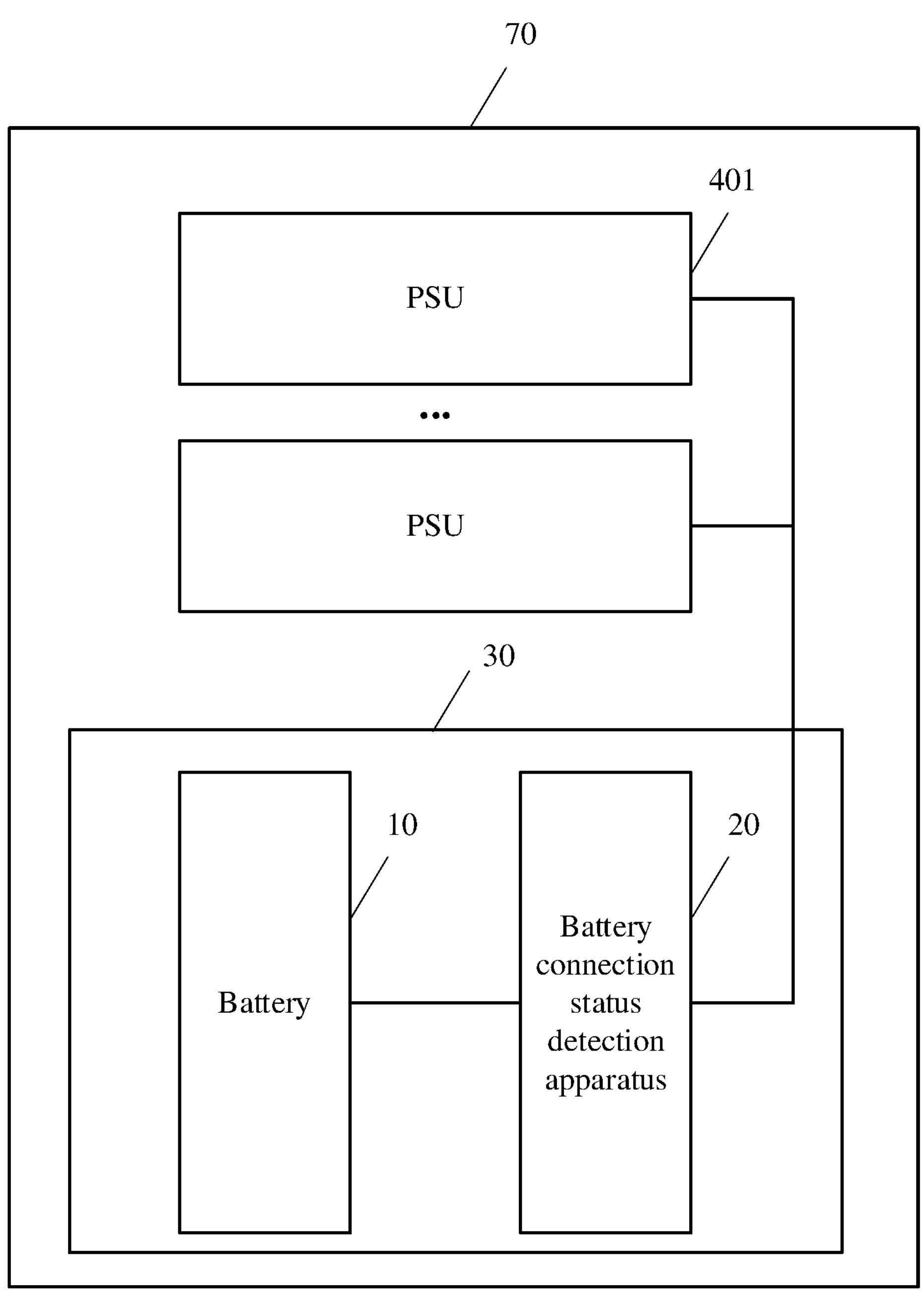
FIG. 8 is a diagram of an energy system according to an embodiment of this application.

FIG. 8 is a diagram of an energy system according to an embodiment of this application.

An energy system 70 provided in this embodiment of this application includes a battery 30 and at least one PSU 401.

The battery 30 includes a cell pack 10 and a battery connection status detection circuit 20.

The cell pack 10 is configured to provide electric energy to a site device.

The battery 30 and the PSU 401 are connected in parallel to a direct current bus of the site device. Each power supply unit is further connected in parallel to one energy storage unit (not shown in the figure).

The PSU 401 is configured to convert an alternating current provided by an external power supply into a direct current, and then provide the direct current to the site device.

The battery connection status detection circuit 20 is configured to detect a connection status of the battery, and can further determine a quantity of PSUs connected in parallel to the direct current bus. For an implementation and a working principle of the battery connection status detection circuit 20, refer to the description in the foregoing embodiments. Details are not described herein in this embodiment of this application.

In some embodiments, the battery 30 is a lithium battery. When the controller determines that the lithium battery is disconnected, a BMS of the battery may further control the lithium battery to enter a standby state, so as to avoid a loss of self-power consumption. In some other embodiments, the battery 30 may further be another type of battery, such as a lead acid battery.

Figure 9:
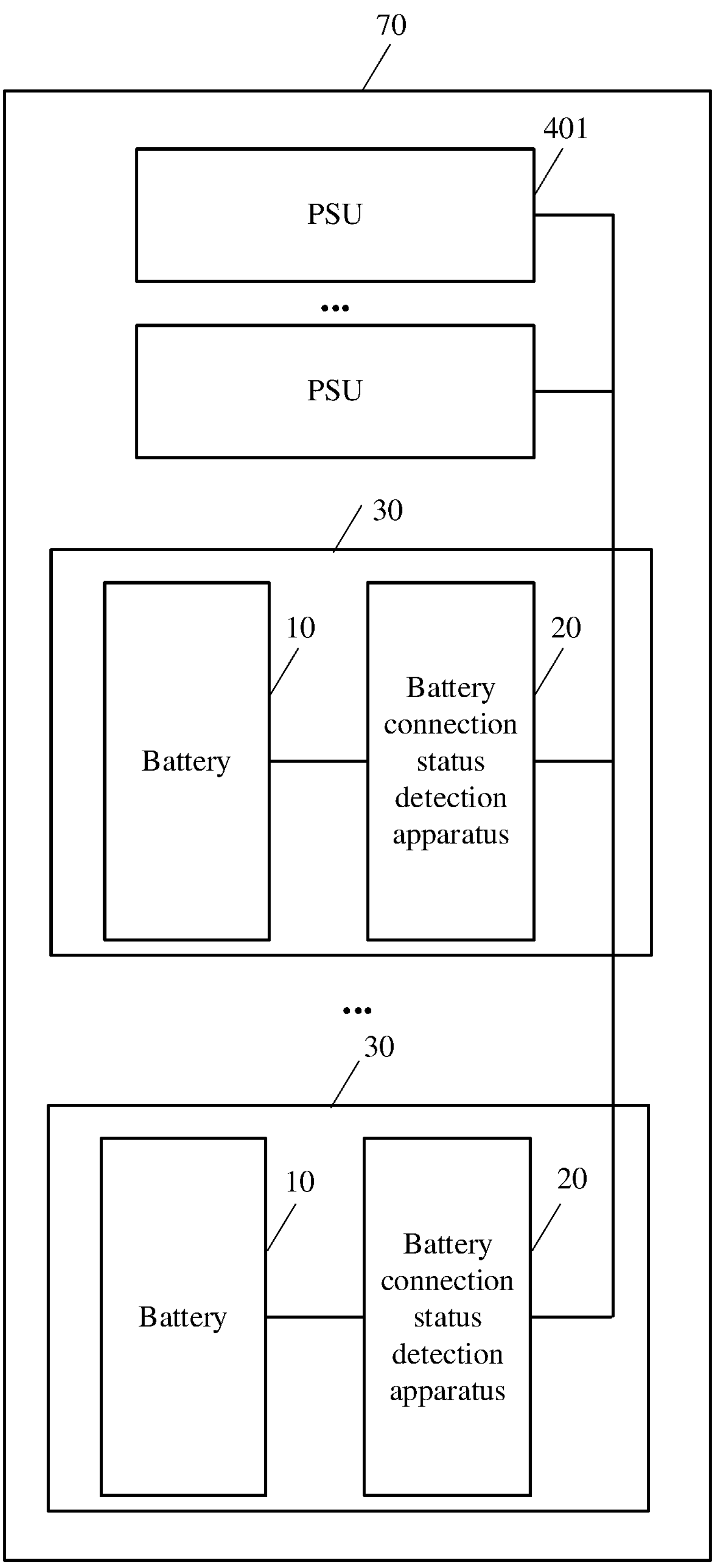
FIG. 9 is a diagram of another energy system according to an embodiment of this application.

Further, refer to another type of energy system shown in FIG. 9. Compared with the energy system shown in FIG. 8, the energy system shown in FIG. 9 includes a plurality of batteries connected in parallel to a direct current bus.

In some embodiments, the controller is further configured to determine, based on a difference of voltages at both terminals of the energy storage unit obtained before and after a preset time period, a sum of quantities of batteries and PSUs that are connected in parallel to the direct current bus.

In some other embodiments, the controller is further configured to determine, based on sampling signals obtained before and after a preset time period, an equivalent value of an electrical parameter of all energy storage units connected in parallel, and determine, based on the equivalent value, a sum of quantities of batteries and PSUs that are connected in parallel to the direct current bus.

The quantities of batteries and PSUs connected in parallel to the direct current bus are not limited in this embodiment of this application.

In conclusion, the energy system provided in this embodiment of this application includes the battery connection status detection circuit. The controller of the detection circuit first controls both a first switch unit and a second switch unit to be closed, and then controls the first switch unit to be opened for the preset time period, so that a discharge unit discharges the energy storage unit. When the battery is in a connected state (connected to a system), the energy storage unit is connected to the discharge unit and an external power supply unit, and a voltage drops slowly. When the battery is disconnected, the energy storage unit is discharged only by the discharge unit, and the voltage of the energy storage unit drops fast. The controller may determine, based on sampling results of a sampling unit obtained before and after the preset time period, whether the battery is connected currently. The detection circuit may be controlled by the controller to actively perform detection. The first switch unit and the second switch unit may be opened when detection is not needed. Therefore, no additional loss of battery power is caused. In addition, the preset time period may be adjusted based on an actual requirement, for example, may be set to a time length of a microsecond level, so as to implement fast battery connection status detection.

Electronic Device Embodiment

Based on the detection circuit provided in the foregoing embodiments, an embodiment of this application further provides an electronic device. The electronic device includes the detection circuit provided in the foregoing embodiments. The following describes the electronic device with reference to the accompanying drawings.

Figure 10:
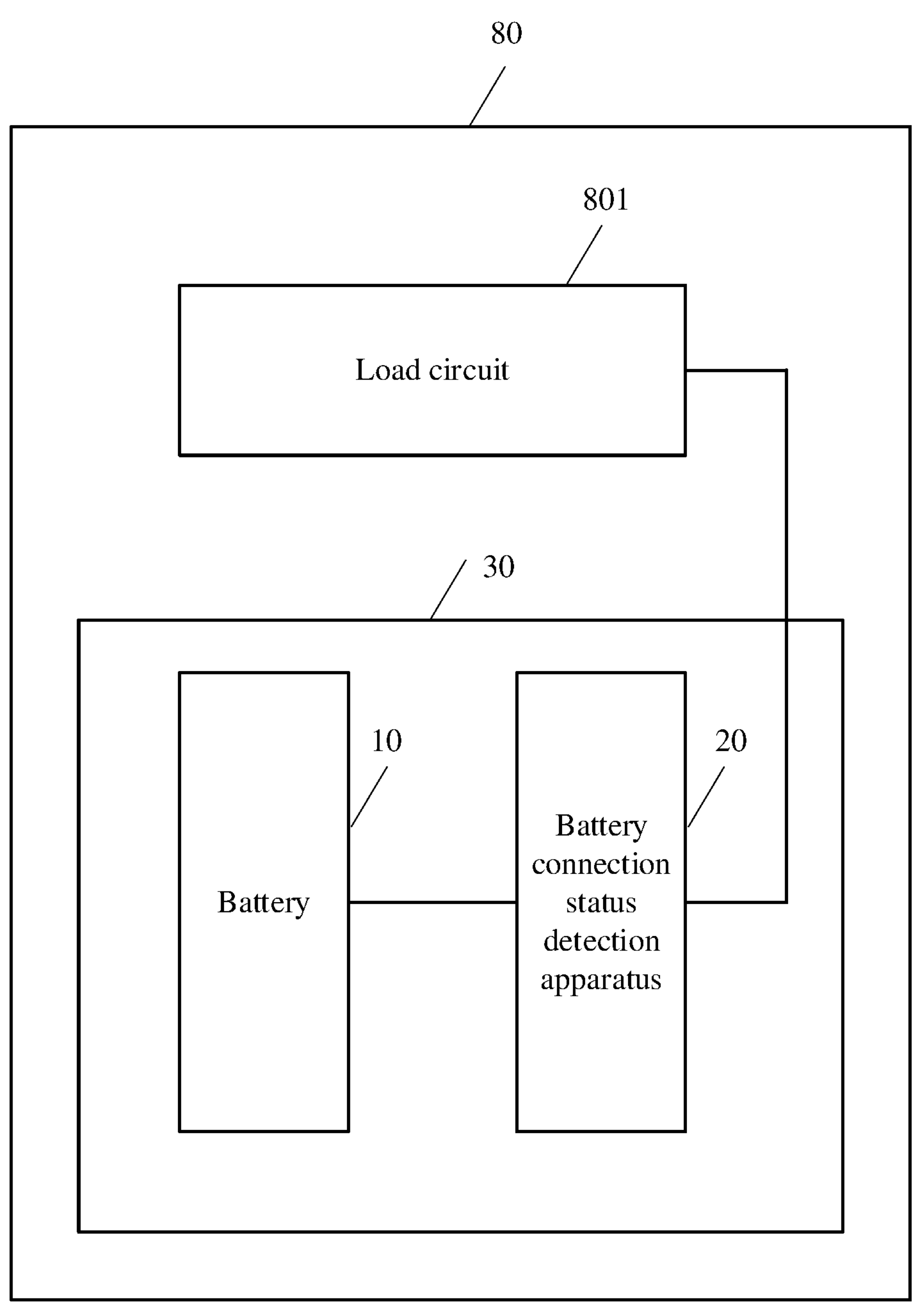
FIG. 10 is a diagram of an electronic device according to an embodiment of this application.

FIG. 10 is a diagram of an electronic device according to an embodiment of this application.

An electronic device 80 provided in this embodiment of this application includes a battery 30 and a load circuit 801.

The battery 30 includes a cell pack 10 and a battery connection status detection circuit 20.

The cell pack 10 is configured to provide electric energy to the load circuit 801.

In some embodiments, the electronic device further includes at least one PSU. The battery 30 and the PSU are connected in parallel to a direct current bus of the electronic device. Each PSU is further connected in parallel to one energy storage unit.

The PSU is configured to convert an alternating current provided by an external power supply into a direct current, and then provide the direct current to the load circuit 801.

The battery connection status detection circuit 20 is configured to detect a connection status of the battery, and can further determine a quantity of PSUs connected in parallel to the direct current bus. For an implementation and a working principle of the battery connection status detection circuit 20, refer to the description in the foregoing embodiments. Details are not described herein in this embodiment of this application.

In this embodiment of this application, a type of the electronic device is not limited. The electronic device may be a mobile phone, a notebook computer, a wearable electronic device (such as a smart watch), a tablet computer, an augmented reality device, a virtual reality device, or the like.

An example in which the electronic device is a notebook computer is used for description. When the notebook computer is disconnected from an external power supply, the PSU does not work, and the notebook computer is powered by the battery. When the notebook computer is connected to an external power supply, in other words, connected to a mains supply, the PSU may convert mains power into a direct current and provide the direct current to the notebook computer. The connection status detection circuit 20 can detect whether the battery is connected normally.

In conclusion, the electronic device provided in this embodiment of this application includes the battery connection status detection circuit. The controller of the detection circuit first controls both a first switch unit and a second switch unit to be closed, and then controls the first switch unit to be opened for a preset time period, so that a discharge unit discharges the energy storage unit. When the battery is in a connected state (connected to a system), the energy storage unit is connected to the discharge unit and an external power supply unit, and a voltage drops slowly. When the battery is disconnected, the energy storage unit is discharged only by the discharge unit, and the voltage of the energy storage unit drops fast. The controller may determine a current connection status of the battery based on sampling results of a sampling unit obtained before and after the preset time period. The detection circuit may be controlled by the controller to actively perform detection. The first switch unit and the second switch unit may be opened when detection is not needed. Therefore, no additional loss of battery power is caused. In addition, the preset time period may be adjusted based on an actual requirement, for example, may be set to a time length of a microsecond level, so as to implement fast battery connection status detection.

The memory in the foregoing embodiments of this application may be a separately disposed memory, or may be a memory integrated inside a controller. This is not limited in the embodiments of this application.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent: a, b, c, "a and b", "a and c", "b and c", or "a, b, and c", where a, b, and c may be singular or plural.

In conclusion, the foregoing embodiments are merely intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A battery connection status detection circuit configured to be disposed in a battery, the battery comprising a cell pack, the battery connection status detection circuit comprising:

a first switch unit;
a second switch unit;
a discharge unit;
a sampling unit;
an energy storage unit; and
a controller;

a first terminal of the first switch unit is connected to a first terminal of the cell pack, and a second terminal of the first switch unit is connected to a second terminal of the cell pack after being connected in series to the energy storage unit;

the second switch unit is connected in parallel to the energy storage unit after being connected in series to the discharge unit, the discharge unit being configured to discharge the energy storage unit;

the sampling unit is connected in parallel to the energy storage unit, and the sampling unit is configured to send a sampling signal to the controller; and the controller is configured to control the first switch unit and the second switch unit and is further configured to determine whether the battery is connected based on the obtained sampling signal.

2. The battery connection status detection circuit according to claim 1, wherein the controller controls both the first switch unit and the second switch unit to be closed, controls the first switch unit to be opened for a preset time period, and determines whether the battery is connected based on sampling signals obtained before and after the preset time period.

3. The battery connection status detection circuit according to claim 2, wherein the sampling signal is a voltage across both terminals of the energy storage unit, and the controller determines whether the battery is connected based on a difference between voltages obtained before and after the preset time period.

4. The battery connection status detection circuit according to claim 2, wherein the controller detects an electrical parameter value of the energy storage unit using the sampling signals obtained before and after the preset time period and compares the detected electrical parameter value with a preset electrical parameter value to determine whether the battery is connected.

5. The battery connection status detection circuit according to claim 4, wherein the energy storage unit comprises an energy storage capacitor, and the electrical parameter is a capacitance.

6. The battery connection status detection circuit according to claim 1, wherein the discharge unit comprises a heating film circuit, and the heating film circuit is configured to heat the battery.

7. The battery connection status detection circuit according to claim 1, wherein the discharge unit comprises a resistor.

8. The battery connection status detection circuit according to claim 1, wherein the first switch unit comprises a switching transistor and a relay connected in parallel.

9. The battery connection status detection circuit according to claim 1, wherein the sampling unit comprises a sampling resistor, and the sampling signal comprises a voltage across both terminals of the sampling resistor or comprises a current flowing through the sampling resistor.

10. A battery, comprising:

a cell pack; and a battery connection status detection circuit, the battery connection status detection circuit comprising:

a first switch unit;
a second switch unit;
a discharge unit;
a sampling unit;
an energy storage unit; and
a controller;

a first terminal of the first switch unit is connected to a first terminal of the cell pack, and a second terminal of the first switch unit is connected to a second terminal of the cell pack after being connected in series to the energy storage unit;

the second switch unit is connected in parallel to the energy storage unit after being connected in series to the discharge unit, the discharge unit is configured to discharge the energy storage unit;

the sampling unit is connected in parallel to the energy storage unit, and the sampling unit is configured to send a sampling signal to the controller;

the controller is configured to control the first switch unit and the second switch unit and is further configured to determine whether the battery is connected based on the obtained sampling signal; and a first terminal of the cell pack is connected to the first terminal of the first switch unit, and a second terminal of the cell pack is connected to the second terminal of the first switch unit by the energy storage unit.

11. An energy system, comprising:

a direct current bus;

at least one power supply unit (PSU); and at least one battery, comprising:

a cell pack; and a battery connection status detection circuit, the battery connection status detection circuit comprising:

a first switch unit;
a second switch unit;
a discharge unit;
a sampling unit;
an energy storage unit; and
a controller;

a first terminal of the first switch unit is connected to a first terminal of the cell pack, and a second terminal of the first switch unit is connected to a second terminal of the cell pack after being connected in series to the energy storage unit;

the second switch unit is connected in parallel to the energy storage unit after being connected in series to the discharge unit, the discharge unit is configured to discharge the energy storage unit;

the sampling unit is connected in parallel to the energy storage unit, and the sampling unit is configured to send a sampling signal to the controller;

the controller is configured to control the first switch unit and the second switch unit and is further configured to determine whether the battery is connected based on the obtained sampling signal;

the at least one battery and the at least one PSU are connected in parallel to the direct current bus of the energy system, and each power supply unit is further connected in parallel to one energy storage unit; and the power supply unit is configured to convert an alternating current provided by an external power supply into a direct current and transmit the direct current to the direct current bus.

12. The energy system according to claim 11, wherein the controller is further configured to determine a sum of quantities of batteries and PSUs that are connected in parallel to the direct current bus, based on a difference of voltages at both terminals of the energy storage unit obtained before and after a preset time period.

13. The energy system according to claim 11, wherein the controller is further configured to determine, based on sampling signals obtained before and after a preset time period, an equivalent value of an electrical parameter obtained after energy storage units are connected in parallel, and determine a sum of quantities of batteries and PSUs that are connected in parallel to the direct current bus, based on the equivalent value.

* * * * *